United States Patent
Seol et al.

(10) Patent No.: US 11,171,338 B2
(45) Date of Patent: Nov. 9, 2021

(54) METHOD OF MANUFACTURING MEMBRANE ELECTRODE ASSEMBLY WITH MINIMIZED INTERFACIAL RESISTANCE

(71) Applicants: Hyundai Motor Company, Seoul (KR); Kia Motors Corporation, Seoul (KR)

(72) Inventors: Su Won Seol, Gyeonggi-do (KR); Yong Min Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 393 days.

(21) Appl. No.: 16/215,066

(22) Filed: Dec. 10, 2018

(65) Prior Publication Data

US 2020/0014037 A1    Jan. 9, 2020

(30) Foreign Application Priority Data

Jul. 4, 2018   (KR) .................. 10-2018-0077900

(51) Int. Cl.
| | |
|---|---|
| *H01M 4/88* | (2006.01) |
| *H01M 8/1004* | (2016.01) |
| *H01M 4/86* | (2006.01) |
| *H01M 8/0286* | (2016.01) |
| *H01M 8/1018* | (2016.01) |

(52) U.S. Cl.
CPC ....... *H01M 4/8828* (2013.01); *H01M 4/8668* (2013.01); *H01M 4/88* (2013.01);
(Continued)

(58) Field of Classification Search
CPC ........ H01M 4/88; H01M 4/86; H01M 8/1004; H01M 4/881; H01M 8/0286;
(Continued)

(56) References Cited

U.S. PATENT DOCUMENTS

| | | | |
|---|---|---|---|
| 10,916,781 B2* | 2/2021 | Oh ...................... | H01M 4/9041 |
| 2009/0186251 A1* | 7/2009 | Budinski ............. | H01M 8/1004 |
| | | | 429/414 |

(Continued)

FOREIGN PATENT DOCUMENTS

| | | |
|---|---|---|
| KR | 101063067 B1 | 9/2011 |
| KR | 101098676 B1 | 12/2011 |

(Continued)

OTHER PUBLICATIONS

KR20170089486A MT (Year: 2017).*

*Primary Examiner* — Alexander Usyatinsky
(74) *Attorney, Agent, or Firm* — Mintz Levin Cohn Ferris Glovsky and Popeo, P.C.; Peter F. Corless

(57) ABSTRACT

Disclosed is a method of manufacturing a membrane electrode assembly with minimized interfacial resistance between an electrode and an electrolyte membrane. For instance, a catalyst admixture including a catalyst composite including a catalyst and a first binder, and a second binder may be applied to a porous substrate and the porous substrate may be impregnated with the second binder, thereby minimizing interfacial resistance between the electrode and the electrolyte membrane and reducing a thickness of the electrolyte membrane.

19 Claims, 2 Drawing Sheets

(52) U.S. Cl.
CPC ......... *H01M 4/881* (2013.01); *H01M 8/0286* (2013.01); *H01M 8/1004* (2013.01); *H01M 2008/1095* (2013.01)

(58) Field of Classification Search
CPC ....... H01M 4/8814; H01M 2008/1095; H01M 4/886; H01M 4/8853; H01M 2004/021; H01M 4/8839; H01M 4/8832; H01M 4/8835; Y02E 60/50; Y02E 60/10; Y02P 70/50
See application file for complete search history.

(56) References Cited

U.S. PATENT DOCUMENTS

| | | | | |
|---|---|---|---|---|
| 2010/0227254 A1* | 9/2010 | Chien | ................ | H01M 4/8814 429/487 |
| 2013/0052560 A1* | 2/2013 | Kawaji | ............... | H01M 8/1018 429/482 |
| 2013/0089805 A1* | 4/2013 | Brooker | .............. | H01M 8/1055 429/480 |
| 2014/0356766 A1* | 12/2014 | Lee | ..................... | H01M 4/8663 429/524 |
| 2015/0118594 A1* | 4/2015 | Liu | ..................... | H01M 4/8605 429/480 |
| 2016/0164068 A1* | 6/2016 | Yano | ................... | H01M 4/0471 156/64 |

FOREIGN PATENT DOCUMENTS

| | | | | |
|---|---|---|---|---|
| KR | 101282678 | B1 | | 7/2013 |
| KR | 101528233 | B1 | | 6/2015 |
| KR | 10-2016-0069470 | A | | 6/2016 |
| KR | 20170089486 | A | * | 8/2017 |
| KR | 10-2017-0115191 | A | | 10/2017 |
| KR | 10-2018-0002089 | A | | 1/2018 |

* cited by examiner

METHOD OF MANUFACTURING MEMBRANE ELECTRODE ASSEMBLY WITH MINIMIZED INTERFACIAL RESISTANCE

CROSS-REFERENCE TO RELATED APPLICATION

This application claims under 35 U.S.C. § 119(a) the benefit of priority to Korean Patent Application No. 10-2018-0077900 filed on Jul. 4, 2018, the entire contents of which are incorporated herein by reference.

TECHNICAL FIELD

The present invention relates to a method of manufacturing a thin membrane electrode assembly with minimized interfacial resistance between an electrolyte membrane and an electrode and reduced the thickness of the electrolyte membrane.

BACKGROUND

The present invention relates to technology concerning a method of manufacturing a thin membrane electrode assembly included in a fuel cell. Among elements of a fuel cell system, a fuel cell stack, which substantially generates electricity, has a structure in which dozens or hundreds of unit cells including membrane electrode assemblies (MEAs) and separators are stacked.

The membrane electrode assembly includes a polymer electrolyte membrane and an anode and a cathode arranged with the polymer electrolyte membrane interposed therebetween. Here, each of the anode (also referred to as a hydrogen electrode, a fuel electrode or an oxidation electrode) and the cathode (also referred to as an air electrode, an oxygen electrode or a reduction electrode) is formed by adsorbing a catalyst layer including nanometer scale catalyst particles onto an electrode substrate formed of carbon paper or carbon cloth.

In the related arts, for example, a membrane electrode assembly has been manufactured by preparing electrodes by coating, spraying or painting catalyst slurries on gas diffusion layers and then thermally compressing the electrodes onto a polymer electrode membrane. Alternatively, a membrane electrode assembly has been manufactured by coating, spraying or painting catalyst slurries directly on a polymer membrane and then thermally compressing gas diffusion layers onto both surfaces of the polymer membrane. FIG. 1 shows a general thermocompression method of manufacturing a membrane electrode assembly. As exemplarily shown in FIG. 1, an electrolyte membrane, an anode and a cathode are respectively manufactured and then the anode and the cathode are compressed onto both surfaces of the electrolyte membrane, thus forming the membrane electrode assembly.

Additionally, in order to increase durability of the electrode membrane, a reinforced membrane formed by impregnating a support layer with an ionomer has been generally used. For example, if a movement path of hydrogen ions is minimized by reducing the thickness of the electrolyte membrane, performance of the membrane electrode assembly may be improved. However, the reinforced membrane may have a limit in reducing the thickness thereof during a process of coating and impregnating the upper and lower surfaces of the reinforced membrane with binders (i.e., formation of at least three-layer structure) and, if the thickness of the reinforced membrane is excessively reduced, when the membrane electrode assembly is manufactured through a decal transfer method, transfer may be difficult.

Moreover, in the related arts, the electrodes and the electrolyte membrane which are respectively manufactured have been bonded by thermocompression. In such case, interfacial resistance between the electrode and the electrolyte membrane occurs and, if the electrolyte membrane is formed by impregnating a porous substrate with a binder, there is a limit in reducing the thickness of the electrolyte membrane during a process of impregnating the porous substrate with the binder and, if the thickness of the electrolyte membrane is excessively reduced, the membrane electrode assembly may not be properly manufactured by the thermocompression method.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a method of manufacturing a membrane electrode assembly which may have minimized interfacial resistance between an electrolyte membrane and an electrode and reduced the thickness of the electrolyte membrane.

In one aspect, the present invention provides a method of manufacturing a membrane electrode assembly. Preferably, the membrane electrode may have a thin electrolyte membrane having a substantially reduced thickness compared to conventional electrolyte membrane. For example, exemplary electrolyte membrane of the present invention may have a thickness less than about 100 µm, less than about 90 µm, less than about 80 µm, less than about 70 µm, less than about 60 µm, less than about 50 µm, less than about 40 µm, less than about 30 µm, less than about 20 µm, less than about 15 µm, or less than about 10 µm.

The method may include preparing a catalyst composite including a catalyst and a first binder, applying a catalyst admixture including the catalyst composite and a second binder to a first surface of a porous substrate to form a first electrode, and forming a second electrode on a second surface of the porous substrate. For example, the catalyst admixture may be a slurry including a solid content and a residual solvent or solution. The first and second surfaces of the porous substrate may be, for example, opposing surfaces or sides of the substrates.

Preferably, the porous substrate may be impregnated with the second binder and the first electrode may include residues of the catalyst slurry.

The porous substrate may suitably have a pore size of about 0.05 µm to 10 µm and porosity of about 5% to 90%.

The porous substrate may have a pore size gradient in a thickness direction of the porous substrate.

The catalyst composite may have a particle size greater than a pore size of the porous substrate. For instance, the catalyst composite may have a particle size (largest dimension of the particle) that is at least about 10, 20, 30, 40, 50, 60, 70, 80, 90 or 100% greater than the pore size (largest dimension of the pore) of the porous substrate. Suitable particle sizes (largest dimension) of the catalyst composite may be, for example, from about 0.1 µm to about 30 µm, or particularly from about 0.2 µm to about 20 µm.

The porous substrate may have a thickness of about 2 µm to 10 µm.

The first binder and the second binder may be polymers. Preferably, the first binder and the second binder may be different. The first binder and the second binder may have equivalent weight, additives or density.

The catalyst composite may be prepared by drying a mixture including the catalyst and the first binder.

A Content of the First Binder May be an Amount of about Content of 2 Parts by Weight to 90 Parts by Weight with Respect to 100 Parts by Weight of the Catalyst.

A content of the second binder may be an amount of about 200 parts by weight to 300 parts by weight with respect to 100 parts by weight of the catalyst composite.

Preferably, the porous substrate may be impregnated with the second binder by performing vacuum suction on the second surface of the porous substrate.

Vacuum suction pressure applied through the vacuum suction may suitably be about 10 kPa to 20 kPa.

Preferably, the residues of the catalyst slurry may include the catalyst composite and a residual amount of the second binder.

Preferably, an inactive region may be formed by adhering a sub-gasket to edge regions of surfaces of the first and second electrodes. A thickness of the inactive region between the edge regions of the surfaces of the first and second electrodes adhered by the sub-gasket may be about 1 mm to 2 mm.

The second electrode may be formed through the same method as the first electrode. The second electrode may be formed through a different method from the first electrode. The second electrode may be formed through a decal transfer method.

Further provided is a vehicle comprising a membrane electrode assembly manufactured by the method described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
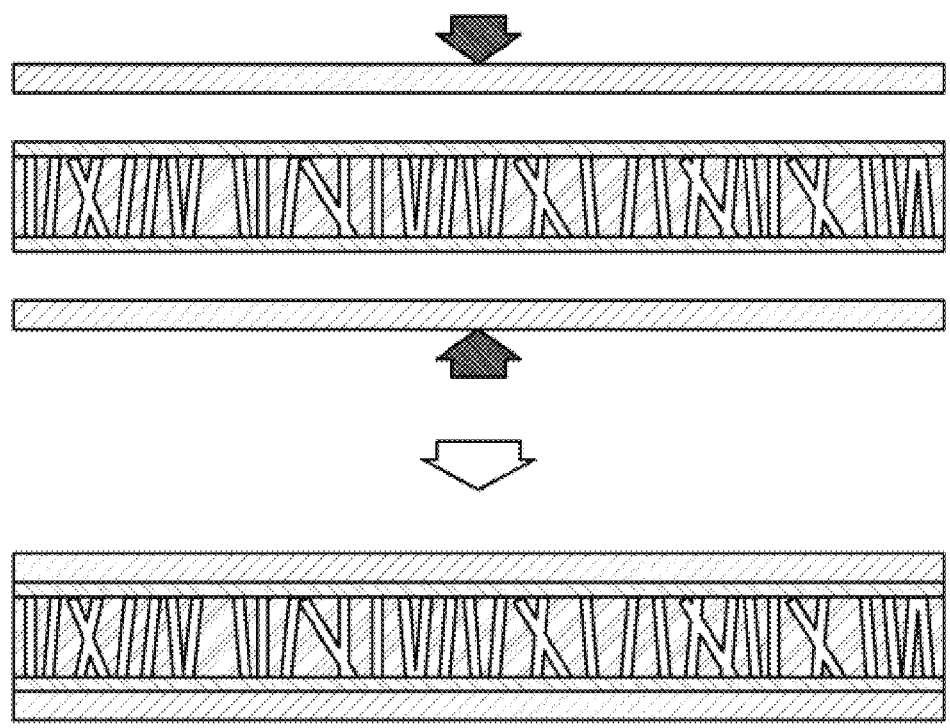
FIG. 1 shows a conventional thermocompression method of manufacturing a membrane electrode assembly.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the annexed drawings. However, the present invention is not limited to the embodiments and may be embodied in different forms. The embodiments are suggested only to offer thorough and complete understanding of the disclosed context and sufficiently inform those skilled in the art of the technical concept of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof. In the following description of the embodiments, terms, such as "including", "having", etc., will be interpreted as indicating presence of characteristics, numbers, steps, operations, elements or parts stated in the specification or combinations thereof, and do not exclude presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a method of manufacturing a membrane electrode assembly. Preferably, the membrane electrode assembly may have substantially reduced thickness, thus, the membrane electrode assembly may be a thin membrane electrode assembly, which may have minimized interfacial resistance between an electrolyte membrane and an electrode and reduced the thickness of the electrolyte membrane so as to minimize a movement path of hydrogen ions.

The method of manufacturing the membrane electrode assembly may include preparing a catalyst composite including a catalyst and a first binder, applying a catalyst slurry including the catalyst composite and a second binder to a first surface of a porous substrate to form a first electrode, and forming a second electrode on a second surface of the porous substrate. The porous substrate may be impregnated with the second binder and the first electrode may be formed by residues of the first slurry.

Figure 2:
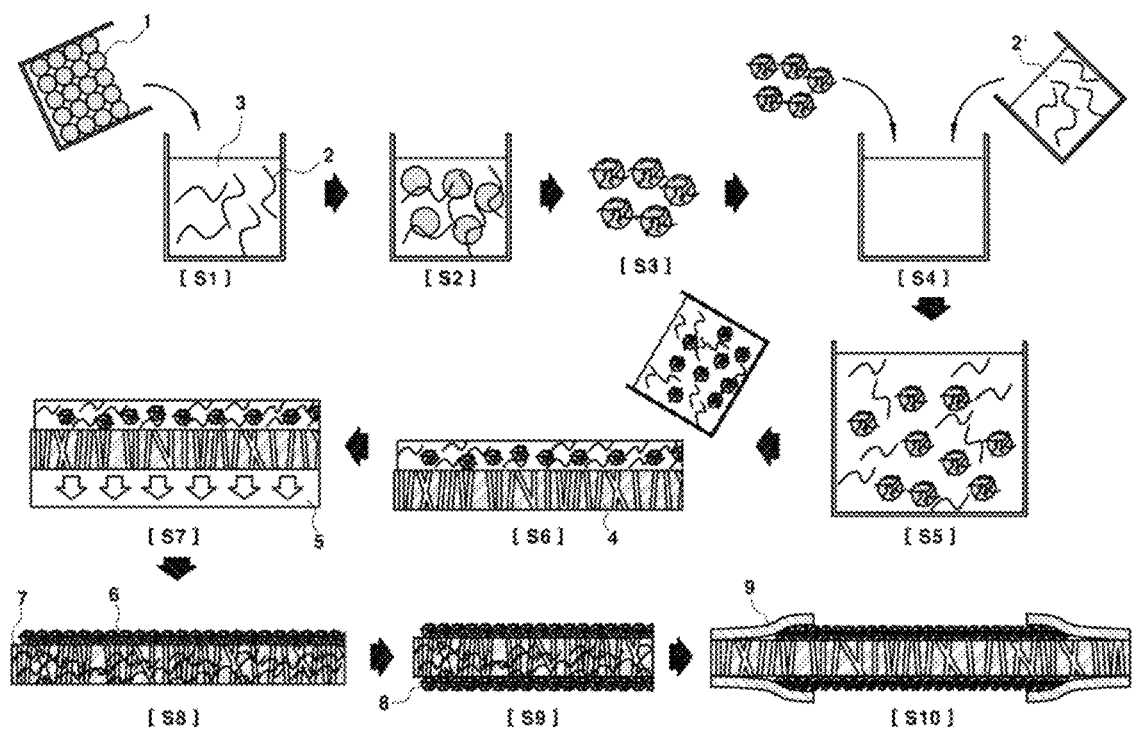
FIG. 2 shows an exemplary process of manufacturing an exemplary membrane electrode assembly according to an exemplary embodiment of the present invention.

FIG. 2 shows an exemplary process of manufacturing an exemplary membrane electrode assembly according to an exemplary embodiment of the present invention.

As shown in FIG. 2, the process of manufacturing the membrane electrode assembly may include injecting a catalyst and a first binder into a solvent (Operation S1), preparing a catalyst mixture by uniformly mixing the catalyst and the first binder with the solvent (Operation S2), preparing a catalyst composite by drying the catalyst mixture (Operation S3), injecting the catalyst composite and a second binder into a solvent (Operation S4), preparing a catalyst admixture by uniformly mixing the catalyst composite and the second binder with the solvent (Operation S5), applying the slurry to a porous substrate (Operation S6), impregnating the porous substrate with the second binder in the slurry (Operation S7), forming a first electrode (Operation S8), forming a second electrode (Operation S9), and adhering a sub-gasket to an inactive region of the membrane electrode assembly (Operation S10).

Hereinafter, the respective Operations will be described in more detail with reference to FIG. 2.

Injection of Catalyst and First Binder into Solvent (Operation S1)

The catalyst and the first binder may be injected into the solvent.

The catalyst of the present invention may suitably include a metal catalyst which may promote or facilitate an oxidation reaction of hydrogen and a reduction reaction of oxygen, and may include one selected from the group consisting of platinum, gold, tin, copper, nickel, iron, cobalt, zinc, titanium, chrome, manganese, iridium, tantalum, molybdenum, rhodium, osmium, rhenium, tungsten, vanadium, cadmium, selenium, tellurium and silver, a mixture thereof or an alloy thereof.

The first binder as used herein may suitably include a cationic conductive polymer or a nonionic conductive polymer.

The cationic conductive polymer may be a polymer having a cation exchange group, and may serve as both a conductor of hydrogen ions which may move hydrogen ions, generated by an anode of a fuel cell, within catalyst layers of the anode and a cathode, and a binder which prevents the catalyst from being separated from the catalyst layer. The cation exchange group may exist as an acid or a salt, and cation exchange groups may suitably include a sulfonic acid group, a phosphonic acid group, a carboxylic acid group, a sulfonimide group, and the like.

Polymers having a cation exchange group may suitably include a polysulfone-based polymer, a polyether ketone-based polymer, a polyether-based polymer, a polyester-based polymer, a polybenzimidazole-based polymer, a polyimide-based polymer, a polyphenylene sulfide-based polymer, a polyphenylene oxide-based polymer, a fluorinated polymer, such as Nafion, etc.

The nonionic conductive polymer may be a polymer having no cation exchange group, and may serve as a binder to fix the catalyst to the catalyst layer. For example, if a liquid electrolyte, such as phosphoric acid, is absorbed into the membrane electrode assembly, serves as a conductor which may move hydrogen ions in the catalyst layer. Nonionic conductive polymers may suitably include a fluorinated polymer, such as poly(vinylidene fluoride) (PVDF) or poly(vinylidene fluoride-co-hexafluoropropylene) (PVDF-HFP), a polybenzimidazole (PBI)-based polymer, a polyimide (PI)-based polymer, a polyphenylene sulfide (PPS)-based polymer, a polyphenylene oxide (PPO)-based polymer, a polyethylene oxide (PEO)-based polymer, a polypropylene oxide (PPO)-based polymer, a polyvinylchloride (PVC)-based polymer and a polyacrylonitrile (PAN)-based polymer, without being limited thereto. The binder polymers may be independently used or a mixture of two or more of the binder polymers may be used.

As the solvent of the present invention, various solvents, such as water, methanol, ethanol, ethylene glycol, isopropyl alcohol, methyl ethyl ketone, n-propyl alcohol, n-butyl acetate, and the like, may be independently used or a mixture thereof may be used.

Preparation of Catalyst Mixture by Mixing Catalyst and First Binder with Solvent (Operation S2)

The catalyst mixture may be prepared by uniformly mixing the injected catalyst and first binder with the solvent. For instance, in order to prevent agglomeration of catalyst particles in the catalyst mixture and to form small particles, the catalyst mixture may be agitated using an ultrasonic agitator or a ball mill. Further, if necessary, in order to remove bubbles from the catalyst mixture, a degassing process may be performed. Further, in order to impart suitable viscosity to the catalyst mixture, an evaporation process may be performed using a rotary evaporator.

In the present invention, the content of the first binder in the catalyst mixture may be in an amount of about 2 parts by weight to 90 parts by weight with respect to 100 parts by weight of the catalyst.

Preparation of Catalyst Composite by Drying Catalyst Mixture (Operation S3)

The catalyst composite may be prepared by drying the catalyst mixture in which the catalyst and the first binder may be uniformly mixed with the solvent.

The catalyst mixture may be suitably dried using an oven or a spray dryer.

Particularly, the catalyst composite in a powder phase may be prepared by spraying and drying the catalyst mixture in a nitrogen atmosphere using the spray dryer. In the prepared catalyst composite, the first binder may be fixed or partially attached to the catalyst. Further, if necessary, bonding force of the first binder may be increased by applying heat to the catalyst composite.

Injection of Catalyst Composite and Second Binder into Solvent (Operation S4)

The catalyst composite, prepared by drying the catalyst mixture, and the second binder may be injected into the solvent.

As the second binder of the present invention, a cationic conductive polymer or a nonionic conductive polymer may be used. As the second binder, the same polymer as the first binder may be selected, or a different polymer from the first binder may be selected, as circumstances demand.

When the first binder and the second binder are different, a criterion to determine a difference between the polymers selected as the first and second binders may be equivalent weights (EWs), additives or densities of the polymers.

The first and second binders may have different equivalent weights. For example, when the equivalent weight of the first binder may be EW500 to EW700, the equivalent weight of the second binder may be EW800 to EW1000.

When the criterion to determine a difference between the polymers selected as the first and second binders is additives, kinds or contents of the additives of the first and second binders may be different.

For example, $ZrO_2$—$SO_4^2$, silica-alumina or zeolite may be used as an antioxidant and, and if necessary, the first and second binders may use different antioxidants.

When the first and second binders have different contents of an additive, for example, the first binder may include an amount of about 10 to 20 parts by weight of an antioxidant with respect to 100 parts of weight of the catalyst or the catalyst composite, and the second binder may include an amount of about 30 to 50 parts by weight of the antioxidant with respect to 100 parts of weight of the catalyst or the catalyst composite.

Preferably, in order to improve oxygen permeability, the first binder and the second binder may have different densities.

For example, the density of the first binder may be less than about 1.9 g/cm³, and the density of the second binder may be about 2 g/cm³ or greater.

The present invention is not limited thereto, and the equivalent weights, additives or densities of the first binder and the second binder may be various.

The content of the injected second binder may be an amount of about 200 parts by weight to 300 parts by weight with respect to 100 parts by weight of the catalyst composite.

The second binder may be suitably injected so that the porous substrate may be impregnated with the greater part of the second binder so as to form an electrolyte membrane, and a polymer which may maximize movement of hydrogen ions within the porous substrate may be suitably selected as the second binder.

Preparation of Catalyst Slurry by Uniformly Mixing Catalyst Composite and Second Binder with Solvent (Operation S5)

The catalyst slurry may be prepared by uniformly mixing the injected catalyst composite and second binder with the solvent. For example, in order to prevent agglomeration of catalyst composite particles in the catalyst slurry and to form small particles, the catalyst slurry may be suitably agitated using an ultrasonic agitator or a ball mill. Further, if necessary, in order to remove bubbles from the catalyst slurry, a degassing process may suitably be performed. Further, in order to impart suitable viscosity to the catalyst slurry, an evaporation process may be performed using a rotary evaporator.

In the present invention, the content of the second binder in the catalyst slurry may be an amount of about 200 parts by weight to 300 parts by weight with respect to 100 parts by weight of the catalyst composite.

Application of Catalyst Slurry to Porous Substrate (Operation S6)

The prepared catalyst slurry may be applied to the first surface of the porous substrate. As a method of applying the catalyst slurry, a spray coating method, a screen printing method, a tape casting method, a painting method, a slot die casting method, a slurry drying method, an electrospinning method, a bar casting method or an inkjet method.

A material which may be used as the porous substrate of the invention is not limited, and the porous substrate may be preferably used to improve durability of the membrane electrode assembly and may thus use any material which may improve chemical resistance, oxidation resistance and thermal/mechanical stability of the membrane electrode assembly.

As the porous substrate used for the above-described purpose, one or more selected from the group consisting of polyethylene, polypropylene, polyester, polyamide, cellulose, polysulfone, polyethersulfone, polyvinylidene fluoride, polyimide polyvinylidene fluoride, polytetrafluoroethylene (PTFE), expanded polytetrafluoroethylene (e-PTFE), polyacrylonitrile and polyamide-imide may be suitably used. Particularly, expanded polytetrafluoroethylene (e-PTFE) may be used.

In accordance with the present invention, the porous substrate may suitably have a thickness of about 10 μm or less. Preferably, the porous substrate may have a thickness of about 2 μm to 8 μm, or particularly, a thickness of about 4 μm to 6 μm. The membrane electrode assembly may not be formed by a thermocompression method or a transfer method and thus such a small thickness of the porous substrate may be acquired.

The porous substrate of the present invention may have a pore size of about 0.05 μm to 10 μm. Further, the porous substrate may suitably have porosity of about 5% to 90%. Preferred porous substrate may have a porosity of about 15% to 90%, 20% to 90%, or 30% to 90%.

The pore size of the porous substrate may be variously adjusted according to a position or a thickness direction of the porous substrate. Further, the density of pores of the porous substrate may be variously adjusted according to the position or the thickness direction of the porous substrate. In other words, the size or density of the pores of the porous substrate may be increased or decreased in a direction from the first surface to the second surface, or from the second surface to the first surface of the porous substrate, and the size or density of the pores of the porous substrate at a desired position may be increased or decreased.

Impregnation of Porous Substrate with Second Binder in Catalyst Slurry (Operation S7)

The porous substrate may be impregnated with the second binder included in the catalyst slurry through the pores of the porous substrate.

Preferably, the catalyst composite in the catalyst slurry applied to the porous substrate may have a particle size greater than the pore size of the porous substrate and, thus, the porous substrate may not impregnated with the catalyst composite. Suitable particle sizes (largest dimension) of the catalyst composite may be, for example, from about 0.1 μm to about 30 μm, or particularly from about 0.2 μm to about 20 μm. Preferably, the porous substrate may be impregnated with a greater part of the second binder included in the catalyst slurry. For example, a small amount of the second binder, or a residual amount of the second binder, together with the catalyst composite may remain on the porous substrate and, thus, a continuous channel may be formed between a catalytic layer including the catalyst composite and an electrolyte membrane layer including the porous substrate impregnated with the second binder. In particular, due to formation of the channel by the second binder, interfacial resistance between the catalytic layer and the electrolyte membrane layer may be substantially reduced.

Preferably, as the pore size of the porous substrate is increased, the content of the second binder may be increased. Further, the amount of the second binder with which the porous substrate is impregnated may be adjusted according to the position and thickness direction of the porous substrate by adjusting the pore density and size of the porous substrate according to the position and thickness direction of the porous substrate.

Preferably, the impregnation speed and impregnation rate of the porous substrate with the second binder may be increased by applying vacuum suction (i.e., vacuum adsorption) to the other surface of the porous substrate, to which the catalyst slurry is not applied, by a vacuum device. Impregnation of the porous substrate with the second binder may be more effectively performed by vacuum suction. Vacuum suction pressure of the vacuum device may be about 10 kPa to 20 kPa.

For example, the vacuum device may perform vacuum suction and may thus overcome a defect in impregnation of the porous substrate with the second binder due to the catalyst composite which is located on the porous substrate and thus clogs inlets of the pores.

Formation of First Electrode (Operation S8)

When impregnation of the porous substrate with the second binder is completed, residues of the catalyst slurry on the porous substrate may be dried and may thus form the first electrode.

Here, the residues of the catalyst slurry may include the catalyst composite including the first binder, and a residual amount of the second binder with which the porous substrate is not impregnated.

Residues of the catalyst slurry may be dried in an oven at a room temperature or at a temperature of about 80° C. If necessary, the drying speed of the residues of the catalyst slurry may be adjusted in a vacuum state.

In accordance with the present invention, simultaneously with formation of the first electrode using the catalyst slurry including the catalyst composite and the residual amount of the second binder, an electrolyte membrane including the porous substrate impregnated with the second binder may be formed. Moreover, if necessary, the first electrode may be first formed and, then, the electrolyte membrane may be formed when a second electrode is formed.

Formation of Second Electrode (Operation S9)

The second electrode may be formed on the other surface of the porous substrate not provided with the first electrode. The second electrode may suitably be formed through the same method as the formation method of the first electrode, without being limited thereto. Alternatively, the second electrode may be formed through a different method from the formation method of the first electrode.

The second electrode may be suitably formed through a different catalyst slurry application method from the catalyst slurry application method of the first electrode, or be formed through other methods than the catalyst slurry application method. For example, the first electrode may be formed using the spray coating method, and the second electrode may be formed using the electrospinning method.

When the second electrode is formed through other methods than the catalyst slurry application method, for example, the second electrode, which is separately formed, and the other surface of the porous substrate not provided with the first electrode may contact each other on a jig for manufacture of a membrane electrode assembly and may be then bonded through a compression process using a hot press, thus completing manufacture of a membrane electrode assembly.

The present invention is not limited thereto, and any method through which the second electrode may be formed on the porous substrate, except for the decal transfer method, may be used.

Preferably, a catalyst composite included in the second electrode may be the same as or different from the catalyst composite included in the first electrode. The catalyst composites may be selected according to a kind of gas reacting with each of the first and second electrodes.

When formation of the second electrode is completed, the membrane electrode assembly for fuel cells may be manufactured. The electrolyte membrane of the membrane electrode assembly of the present invention may have a thickness of about 10 μm or less.

Adhesion of Sub-Gasket to Inactive Region of Membrane Electrode Assembly (Operation S10)

The sub-gasket may be suitably adhered to edge regions of both surfaces of the membrane electrode assembly.

Figure 3:
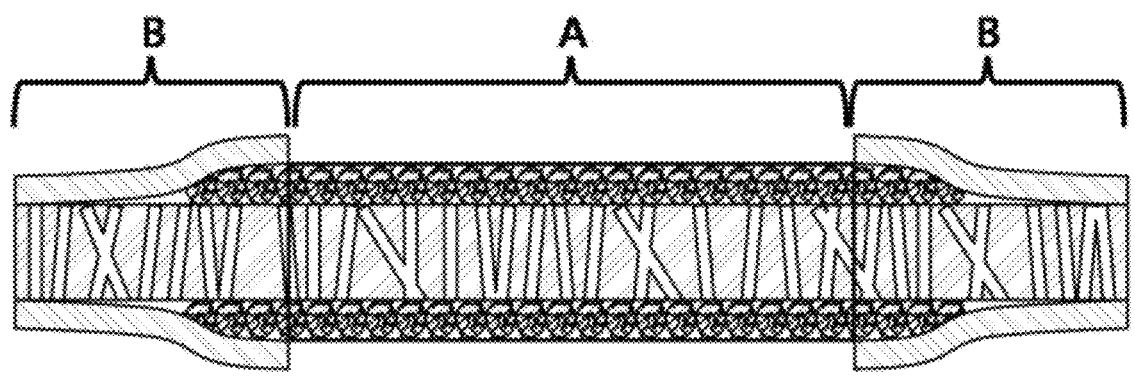
FIG. 3 is a cross-sectional view illustrating adhesion of an exemplary sub-gasket to an exemplary inactive region of the membrane electrode assembly according to an exemplary embodiment of the present invention.

FIG. 3 shows an exemplary membrane electrode assembly to which the sub-gasket may be adhered. Preferably, the sub-gasket may be adhered to a region of the membrane electrode assembly except for an active region A in which gas exchange is carried out on the electrodes and thus forms an inactive region B. Here, the thickness of the inactive region B to which the sub-gasket is adhered may be about 1 mm to 2 mm.

Preferably, adhesion of the sub-gasket to the membrane electrode assembly may be performed through a method using a hot press, a roll or ultrasonic vibration.

The sub-gasket may suitably be adhered to the edge regions of both surfaces of the membrane electrode assembly so as to facilitate handling of the membrane electrode assembly and to secure physical durability of the membrane electrode assembly.

For example, the sub-gasket may be adhered to the membrane electrode assembly including the first electrode, the second electrode and the electrolyte membrane and thus forma five-layer membrane electrode assembly, and a gas diffusion layer (GDL) may be additionally stacked on an outer surface of each of the first and second electrodes and thus form a seven-layer membrane electrode assembly.

According to various exemplary embodiments of the present invention, the method of manufacturing a membrane electrode assembly may minimize interfacial resistance between an electrode and an electrolyte membrane and form the electrolyte membrane having the reduced thickness, e.g., of about 100 μm or less, 50 μm or less, 40 μm or less, 30 μm or less, 20 μm or less, or about 10 μm, during a process of simultaneously forming the electrode and the electrolyte membrane so as to minimize a movement path of hydrogen ions.

The present invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly, comprising:
   preparing a catalyst composite by drying a mixture comprising a catalyst and a first binder;
   applying a catalyst admixture comprising the catalyst composite and a second binder to a first surface of a porous substrate to form a first electrode; and
   forming a second electrode on a second surface of the porous substrate, and
   wherein the first binder is fixed or partially attached to the catalyst.

2. The method of claim 1, wherein the porous substrate is impregnated with the second binder and the first electrode comprises residues of the catalyst admixture.

3. The method of claim 1, wherein the porous substrate has a pore size of about 0.05 μm to 10 μm and porosity of about 5% to 90%.

4. The method of claim 1, wherein the porous substrate has a pore size gradient in a thickness direction of the porous substrate.

5. The method of claim 1, wherein the catalyst composite has a particle size greater than a pore size of the porous substrate.

6. The method of claim 1, wherein the porous substrate has a thickness of about 2 μm to 10 μm.

7. The method of claim 1, wherein the first binder and the second binder are polymers different.

8. The method of claim 1, wherein the first binder and the second binder have different equivalent weight, additives or density.

9. The method of claim 1, wherein a content of the first binder is an amount of about 2 parts by weight to 90 parts by weight with respect to 100 parts by weight of the catalyst.

10. The method of claim 1, wherein a content of the second binder is an amount of about 200 parts by weight to 300 parts by weight with respect to 100 parts by weight of the catalyst composite.

11. The method of claim 1, wherein the porous substrate is impregnated with the second binder by performing vacuum suction on the second surface of the porous substrate.

12. The method of claim 11, wherein a vacuum suction pressure applied through the vacuum suction is about 10 kPa to 20 kPa.

13. The method of claim 2, wherein the residues of the catalyst admixture comprises the catalyst composite and a residual amount of the second binder.

14. The method of claim 1, wherein an inactive region is formed by adhering a sub-gasket to edge regions of surfaces of the first and second electrodes.

15. The method of claim 14, wherein a thickness of the inactive region between the edge regions of the surfaces of the first and second electrodes adhered by the sub-gasket is about 1 mm to 2 mm.

16. The method of claim 1, wherein the second electrode is formed through the same method as the first electrode.

17. The method of claim 1, wherein the second electrode is formed through a different method from the first electrode.

18. The method of claim 1, wherein the second electrode is formed through a decal transfer method.

19. A vehicle comprising a membrane electrode assembly manufactured by the method of claim 1.

* * * * *